US008026461B2

(12) United States Patent
Salesse et al.

(10) Patent No.: US 8,026,461 B2
(45) Date of Patent: Sep. 27, 2011

(54) CLAMPING TOOL, PARTICULARLY SOLDERING PLIERS, WITH A COMPENSATION SYSTEM

(76) Inventors: Christian Salesse, Annonay (FR); Jean-Marc Loriot, Paris (FR)

( * ) Notice: Subject to any disclaimer, the term of this patent is extended or adjusted under 35 U.S.C. 154(b) by 1151 days.

(21) Appl. No.: 10/589,056

(22) PCT Filed: Feb. 10, 2005

(86) PCT No.: PCT/FR2005/000306
§ 371 (c)(1),
(2), (4) Date: May 24, 2007

(87) PCT Pub. No.: WO2005/077585
PCT Pub. Date: Aug. 25, 2005

(65) Prior Publication Data
US 2007/0221018 A1    Sep. 27, 2007

(30) Foreign Application Priority Data

Feb. 13, 2004  (FR) .................................... 04 01432

(51) Int. Cl.
*B25B 1/10* (2006.01)
*B25B 5/10* (2006.01)
*B23K 11/31* (2006.01)
*B23K 3/00* (2006.01)
*B23K 11/36* (2006.01)

(52) U.S. Cl. .................... 219/234; 219/85.1; 219/86.33; 219/161; 74/89.23; 74/89.32; 74/89.34; 269/240; 269/243; 269/244

(58) Field of Classification Search .......... None
See application file for complete search history.

(56) References Cited

U.S. PATENT DOCUMENTS 3,606,801 A * 9/1971 Williams .................... 74/89.23
(Continued)

FOREIGN PATENT DOCUMENTS
WO    WO 02/076665 A1    10/2002

OTHER PUBLICATIONS

International Search Report, dated Jun. 23, 2005, corresponding to PCT/FR2005/000306.

*Primary Examiner* — Joseph M Pelham
(74) *Attorney, Agent, or Firm* — Christie, Parker & Hale LLP

(57) ABSTRACT

Clamping means which may be used with soldering pliers, having a first element (18) and a second element (20) relatively displaceable by the action of a screw (10) that can be rotated about an axis (XX) by the action of a motor (M); a nut (12) cooperating with the screw (10) and which can be driven in the direction of the screw axis (XX), the screw being coupled to the first element (18); first guiding means (34L) defining linear guidance parallel to the axis (XX) of the screw to prevent rotation of the nut (12) in a first phase of displacement of the nut; and second helicoidal guiding means (34H) extending with the axis (XX) of the screw (12) and which has an thread inverted in relation to the screw thread to allow the nut (12) to rotate in the same direction of rotation as the screw (10) in a second nut displacement phase; in addition to a compensation system (46) arranged between the first element (18) and a mobile support (14) coupled to the nut (12) in order to reinitialize the position of the first element (18) in relation to the second element (20).

9 Claims, 4 Drawing Sheets

Figure 1:
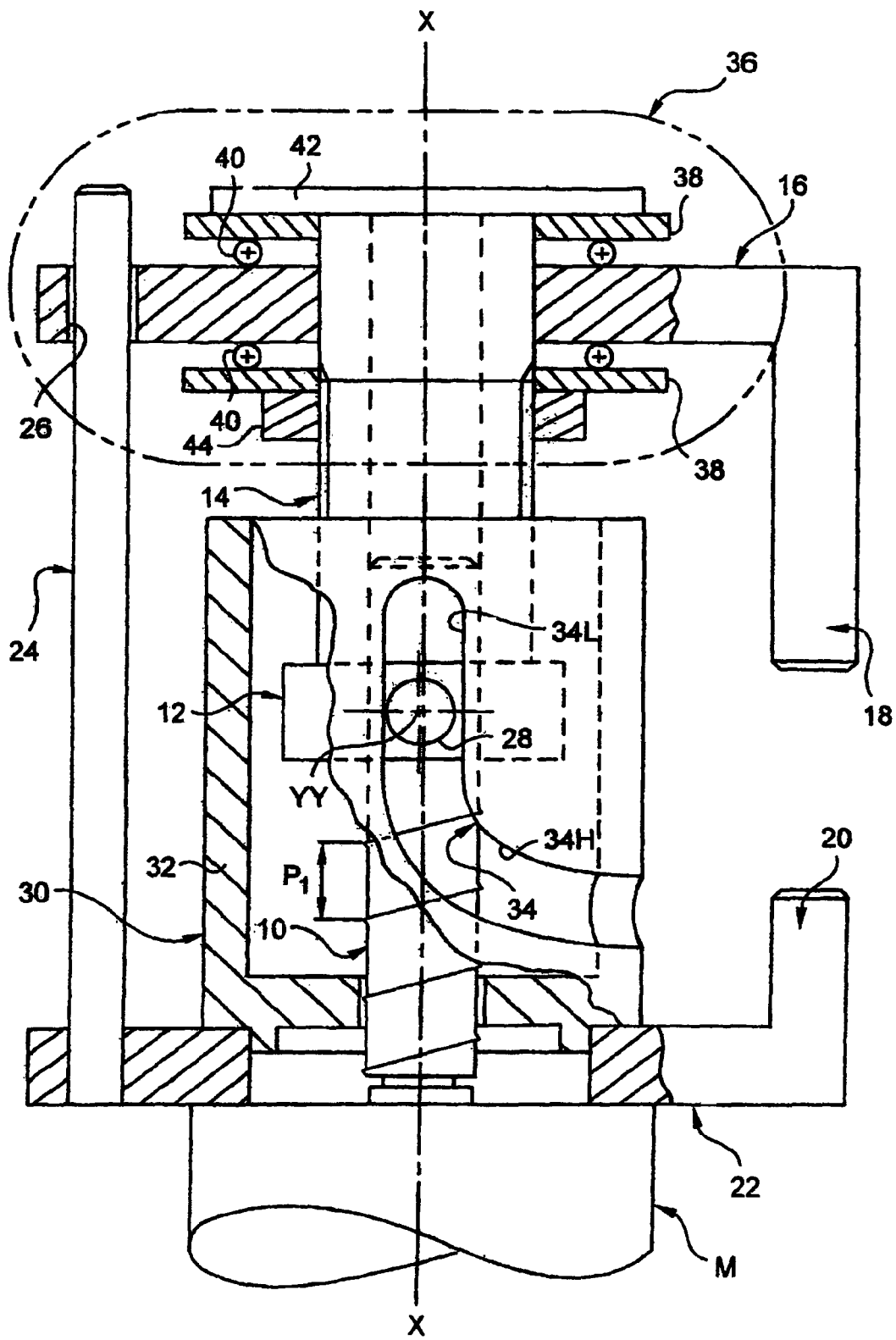

U.S. PATENT DOCUMENTS 6,204,468 B1 * 3/2001 Habert .................. 219/86.51
7,098,419 B2 * 8/2006 Salesse et al. ............ 219/86.32
2004/0140294 A1 7/2004 Salesse et al.
2009/0224456 A1 * 9/2009 Loriot et al. .................. 269/240

* cited by examiner

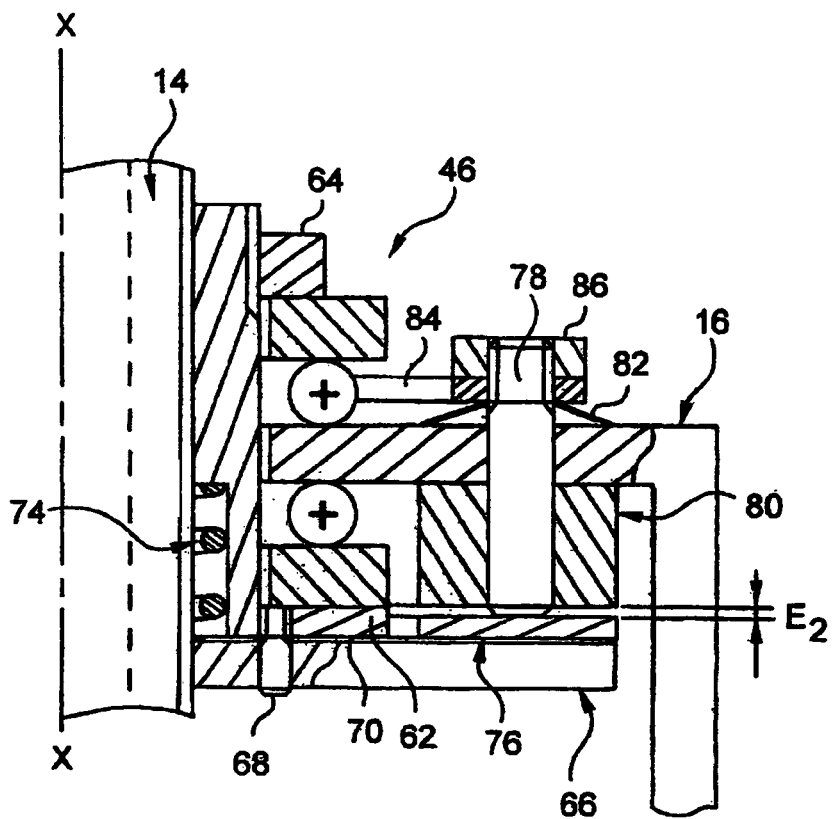
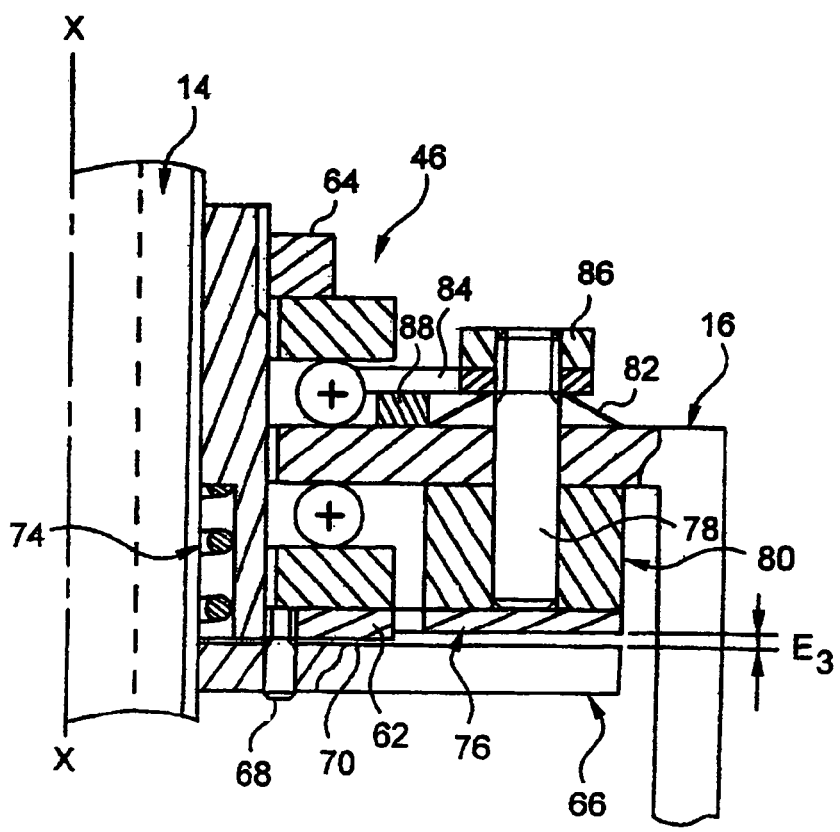

CLAMPING TOOL, PARTICULARLY SOLDERING PLIERS, WITH A COMPENSATION SYSTEM

CROSS-REFERENCE TO RELATED APPLICATION

This application is a National Phase Patent Application of International Application Number PCT/FR2005/000306, filed on Feb. 10, 2005, which claims priority of French Patent Application Number 0401432, filed on Feb. 13, 2004.

The invention relates to the field of clamping tools, such as in particular soldering pliers.

It relates more particularly to a clamping tool comprising a first element and a second element capable of relative displacement under the action of a drive device, this device comprising a screw with a given pitch capable of being driven in rotation about an axis in one direction or in the opposite direction under the action of a motor; a nut cooperating with the screw and capable of being driven in translation in the direction of the axis of the screw, the nut being rigid in translation with the first element; first guide means defining a linear guide parallel to the axis of the screw in order to lock the nut in rotation in a first phase of displacement of the nut; and second guide means defining a helicoidal guide which extends along the axis of the screw and which has a reverse pitch relative to the pitch of the screw in order to allow rotation of the nut in the same direction of rotation as the screw in a second phase of displacement of the nut.

From the international publication WO 02/076665, a clamping tool of this type is already known whose drive device has a variable cinematic relation with a first displacement phase, where the nut is locked in rotation, and a second displacement phase in which the nut is driven in rotation in the same direction as the screw, which then makes it possible to decrease the apparent pitch of the screw and therefore the rate of translation of the nut in this second displacement phase.

In a preferred embodiment, this known clamping tool takes the form of soldering pliers, in which the first element (also called "mobile element") forms an electrode, whereas the second element (also called "fixed element") forms a counter-electrode.

In this particular application to the soldering pliers, the operation of the drive device may be impaired due to progressive wear of the electrodes. In particular, when such soldering pliers are used for soldering sheet metal, the point of impact of the electrode on the sheet metal then corresponds to variable positions of the nut relative to the guide means for axial and helicoidal guiding. It may happen, for example, that the nut is guided too early by the second guide means (helicoidal guiding), which then has the effect that the slowing down phase occurs too early, whereas the distance separating the ends of the worn electrodes is too great.

In general, this disadvantage occurs in such clamping tools whether or not these are soldering pliers, the mutual position of the first element and of the second element having to be periodically recalibrated.

The object of the invention is in particular to overcome such a disadvantage.

It proposes to this end a compensation system interposed between the first element and a mobile support rigid with the nut in order to reinitialise the position of this first element relative to the second element, so that the first and second displacement phases generated by the first and second guide means remain synchronous with the phases necessary to optimisation of the displacement of the first element.

This compensation system thus makes it possible to reinitialise or calibrate periodically the position of the nut relative to the first element, and in particular the position in which the nut leaves the first guide means defining a linear guide in order to meet the second guide means defining a helicoidal guide.

Thus, when the nut is equipped with tracking elements, such as rollers, as is described in the above-mentioned publication, this makes it possible to reinitialise the position where the rollers leave the linear guide in order to meet the helicoidal guide.

In a preferred embodiment of the invention, the compensation system comprises the mobile support realised in the form of a tubular element rigid with the nut and equipped with a male thread, as well as a hub with a female thread cooperating with the male thread of the tubular support, this hub supporting the first element via a thrust ball bearing.

Preferably, the clamping tool comprises positioning means for placing the hub selectively in one of the three following positions:
normal position ("position A") in which the hub is rigid in translation and in rotation with the mobile support;
reinitialising position ("position B") in which the hub is rigid in translation and rotation with the first element; and
intermediate position ("position C") in which the hub is free except for its connection to the thrust ball bearing and its threaded connection to the mobile support.

The above-mentioned positioning means can take different forms.

In one embodiment, given by way of example, these positioning means comprise a nut plate rigid in rotation with the hub and freely displaceable in axial translation relative to the hub and having a female thread in order to cooperate with the male thread of the tubular support; a spring contrived to separate the nut plate from one end of the hub; solenoid plungers rigid with a mobile disc and traversing a plate forming part of the first element; and a winding carried by the plate and contrived, when supplied with electricity, to displace the nut plate towards the end of the hub and the mobile disc rigid with the solenoid plungers towards the nut plate, counter to a spring-back element acting on the solenoid plungers.

In a preferred embodiment, it is provided that:
in the normal position ("position A"), the winding is not supplied with electricity, so that the nut plate is spaced from the end of the hub, thus ensuring locking of the hub on the mobile support;
in the reinitialising position ("position B"), the winding is supplied with electricity, so that the nut plate is brought closer into contact with the end of the hub and the mobile disc moves closer into contact with the nut plate, thus ensuring locking of the hub on the plate and, consequently, on the first element; and
in the intermediate position ("position C"), the winding is supplied with electricity, so that the nut plate moves closer into contact with the end of the hub, whereas the mobile disc is moved closer to the nut plate without coming into contact therewith due to the fact that the solenoid plungers are held in an intermediate position, the hub being free except for its connection to the thrust ball bearing and a threaded connection to the mobile support.

The clamping tool advantageously comprises a fixed support which carries the motor and the second element known as the "fixed element".

According to another feature of the invention, the clamping tool comprises a column fixed to the fixed support and extending in a direction parallel to the axis of rotation of the screw in order to ensure guiding in translation of the mobile support which carries the first element known as the "mobile element".

According to yet a further feature of the invention, the clamping tool has a hollow cylindrical support which has a cylindrical wall centered on the axis of rotation of the screw, and in which are cut two opposite slides each defining the first and second guide means, and in which two tracking elements carried by the nut are respectively moved.

In a preferred embodiment of the invention, the clamping tool takes the form of soldering pliers in which the first element and the second element form an electrode and a counter-electrode respectively.

However, the clamping tool according to the invention has applications in other fields, for example in order to control the straps of a disc brake of a motor vehicle.

Figure 2:
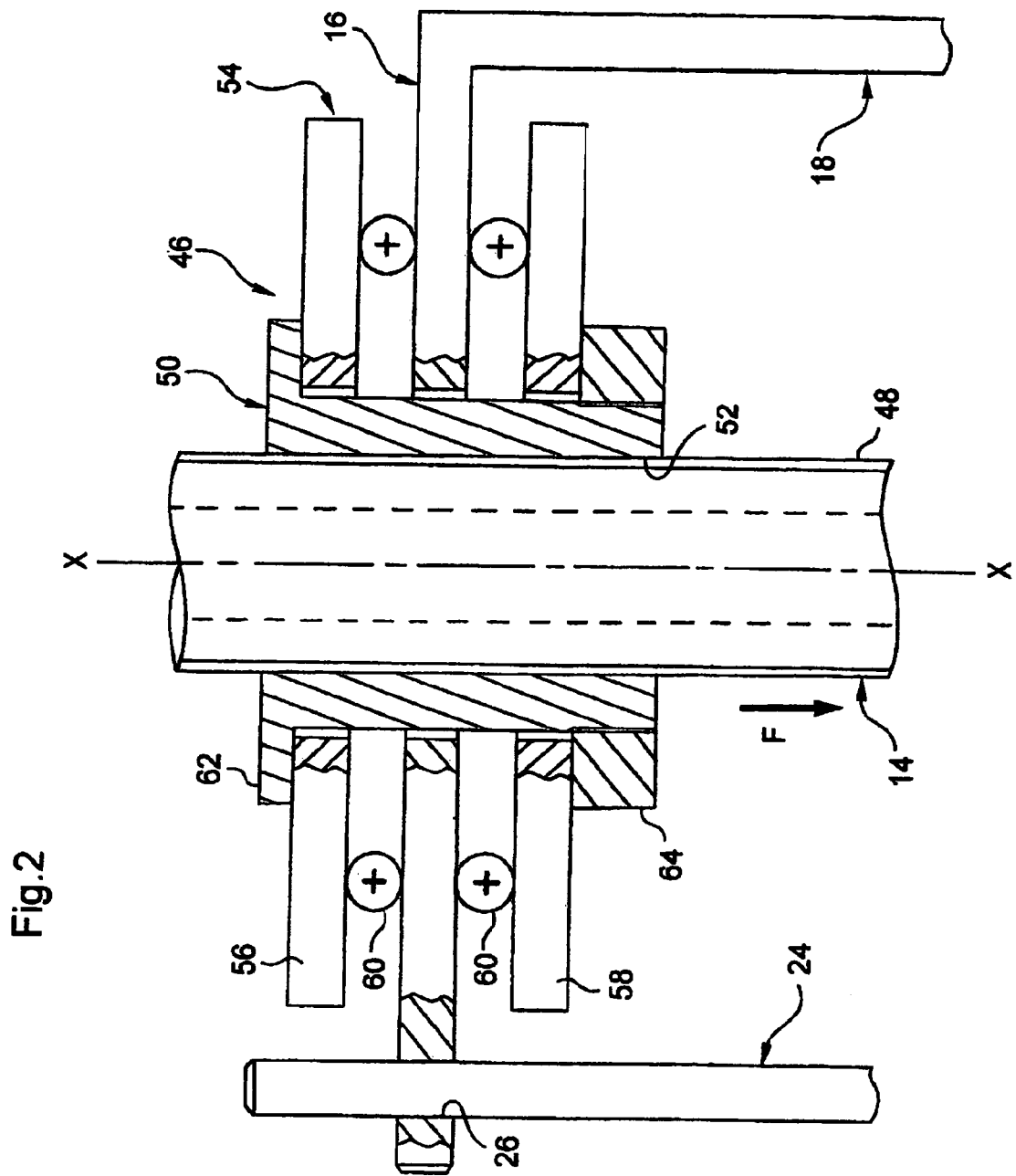
Figure 3:
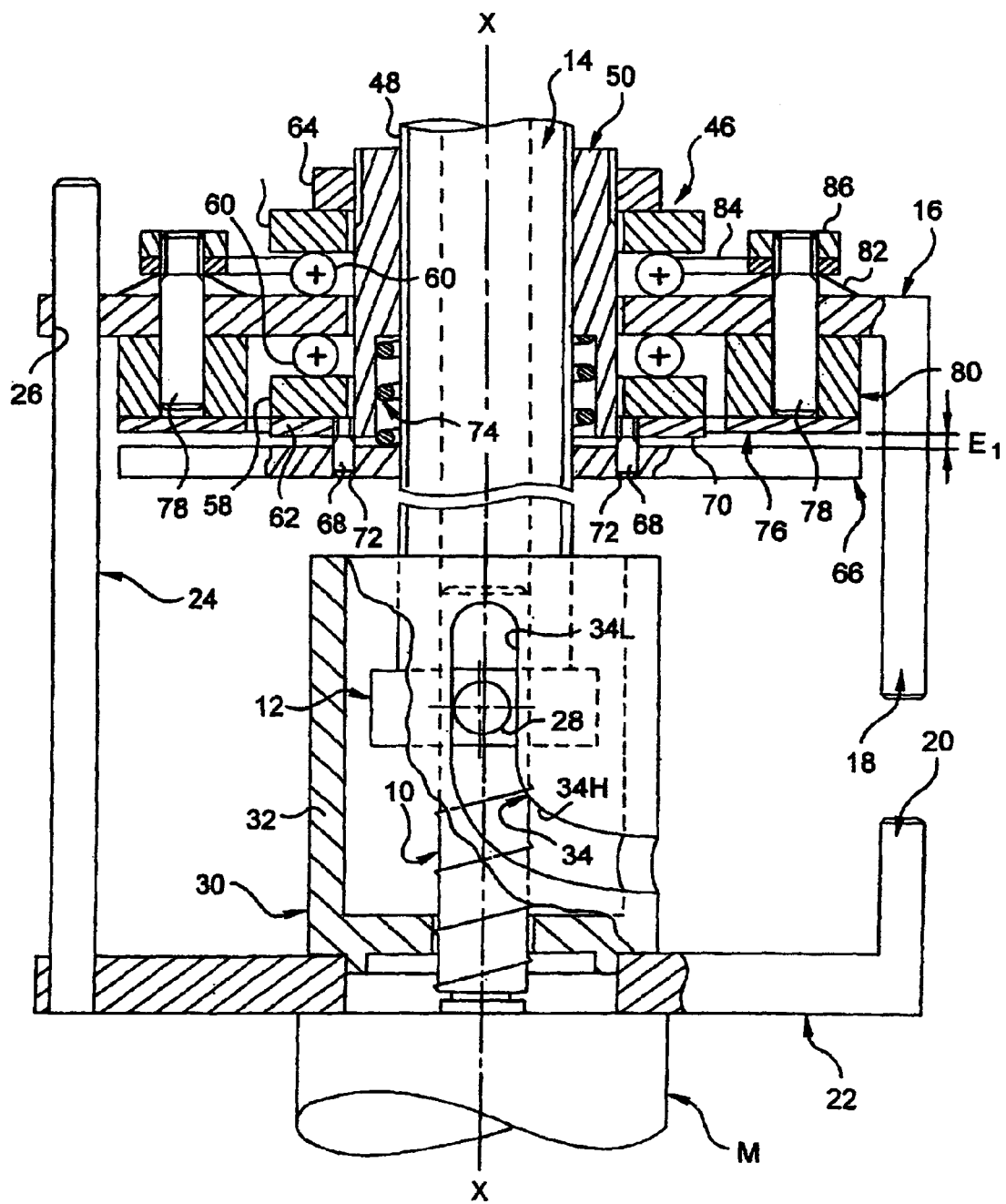

In the following description, given solely by way of example, we refer to the attached drawings, which show:

FIG. 1, an elevation view, partially opened up, of a clamping tool according to the prior art;

FIG. 2, part of the device from FIG. 1 modified to incorporate a compensation system according to the invention;

FIG. 3, a clamping tool equipped with a compensation system according to the invention, whose positioning means are shown in a normal position (position A); and FIGS. 4 and 5, partial views of FIG. 3 on an enlarged scale, showing the positioning means respectively in a reinitialising position (position B) and in an intermediate position (position C).

The clamping tool shown in FIG. 1 is of the type described in the international publication WO 02/076665 mentioned above, to which reference can be made for further details.

Briefly, the clamping tool is equipped with a clamping device comprising a screw 10 capable of being driven in rotation about an axis XX via an electric motor M which may be coupled to a digital control.

This screw has a large pitch P1 and can be driven in rotation in either direction by the motor M. The screw 10 cooperates with a nut 12 capable of being driven in translation in the direction of the axis XX of the screw. This nut is rigid with a support 14, also called "mobile support", here taking the form of a tubular element which at least partly surrounds the screw 10. The support 14 is connected to a plate 16 which carries a first element 18 (also called "mobile element") capable of being displaced in translation, in a direction parallel to the axis XX, in order to move closer to or further from a second element 20 (also called "fixed element") carried by a fixed support 22, which also carries the motor M. A column 24 is fixed to the fixed support 22 and extends in a direction parallel to the axis XX in order effect guiding in translation of the mobile support 14 carrying the mobile element 18. The plate 16 is equipped to this end with an axial bore 26 traversed by the column 24.

In the particular embodiment where the clamping tool is a pair of soldering pliers, the mobile element 18 and the fixed element 20 form an electrode and a counter-electrode respectively.

In the embodiment, the pitch P1 of the screw 10 is a right-handed pitch whose value is advantageously of the order of its own diameter. The nut 12 is equipped with a pair of rollers 28, which form tracking elements and which are mounted rotatably about an axis YY which is perpendicular to the axis XX of the screw. Only one of the two rollers 28 is visible in FIG. 1

The fixed support 22 carries a hollow cylindrical support 30, also called a "hollow sleeve", which has a cylindrical wall 32 in which are cut two opposite slides 34 (only one of the two slides is visible in FIG. 1). The rollers 28 mentioned above are contrived to roll respectively in the two slides 34, which form guide means. Each of the slides 34 has a linear part 34L extending parallel to the axis of the screw in order to obtain linear guiding for the nut 12, as well as a helicoidal part 34H which is joined to the linear part 34L in order to obtain helicoidal guiding. This helicoidal part extends along the axis XX of the screw and has a pitch P2 which is inverted relative to the pitch P1 of the screw, and which is therefore a left-handed thread in the example. Provided the rollers 28 are in contact with the parts 34L of the slides, these prevent the nut from turning, and this can move in translation at a linear speed imposed by the angular speed of the motor and the pitch P1 of the screw. This forms a first phase of displacement D1, also known as the stroke, which may be termed the inertia phase.

Upon approaching the clamping point, i.e. when the rollers 28 move closer respectively to the helicoidal parts 34H, these drive the nut in rotation in the same direction as rotation as the screw. Consequently, the linear speed of the nut decreases until it possibly reaches zero. In fact, this derives from an apparent variation in pitch (in fact the linear speed of the nut is synchronised on the pitch P2). It should be noted that this pitch P2 may be constant or variable.

If it is supposed, consequently, that the screw 10 is driven in rotation about its axis at a set constant angular speed, the nut first moves (in the direction of clamping) at a constant speed for the phase D1 (inertia phase) and then at a slower speed in a second phase D2.

In this clamping device according to the prior art, the support 14 is connected to the plate 16 of the mobile element 18 by a thrust ball bearing referenced 36 as a whole, via which the mobile support 14 remains permanently rigid in translation with the mobile element 18. This thrust ball bearing 36 has two counter-flanges 38 disposed respectively on either side of the plate 16 and bearing thereon via balls 40. The two counter-flanges 38 are held axially between a collar 42 provided at one end of the mobile support 14 and a nut 44 screwed on to another end of the mobile support 14.

The device according to the prior art has the disadvantage mentioned in the introduction, notably that it cannot compensate for a deviation arising between the elements 18 and 20, particularly when these elements are electrodes which are progressively worn down.

The invention makes it possible to overcome this disadvantage by replacing the thrust ball bearing 36 of FIG. 1 with a compensation mechanism which will now be described with reference to FIG. 2.

The compensation system 46 shown in FIG. 2 is interposed between the first element 18 and the mobile support 14 (which is rigid with the nut 12) in order to reinitialise the position of the first element 18 relative to the second element 20, so that the first and second phases of displacement D1 and D2 generated by the first and second guide means 34L and 34H remain synchronous with the phases necessary for optimisation of the displacement of the first element 18.

In the example, the compensation system 46 comprises the mobile support 14, which is realised as a tubular element rigid with the nut 12 and equipped with a male thread 48. The compensation system further comprises a hub 50 equipped with a female thread 52 in order to cooperate with the male thread 48 of the mobile support 14. This hub 50 supports the first element 18 via a thrust ball bearing 54, which takes the form of a double-acting stop comprising the plate 16 and two counter-flanges 56 and 58 bearing on the plate via balls 60.

These two counter-flanges are held axially between a collar 62 formed at one end of the hub 50 and a nut 64 screwed about another end of the hub.

The compensation system 46 makes it possible, at frequencies defined according to the service of the clamping tool, to reinitialise the position of the mobile element 18 relative to the fixed element 20, so that the different movement phases generated by the guide means of the cylindrical support 30 (hollow sleeve) remain synchronous with the movement phases necessary for optimisation of the movement of the mobile element 18.

This compensation system allows relative longitudinal displacement of the element 18 relative to the element 20 in order to compensate for the variations in their spacing. This has a particular advantage in the case where the mobile element 18 and the fixed element 20 respectively form an electrode and a counter-electrode, in order to compensate the sum of their respective wear.

Positioning means, an embodiment of which will be described below, make it possible to place the hub 50 selectively in one of the three following positions:

normal position ("position A") in which the hub 50 is rigid in translation and in rotation with the mobile support 14;

reinitialising position ("position B") in which the hub 50 is rigid in translation and rotation with the first element 18; and intermediate position ("position C") in which the hub is free except for its connection to the thrust ball bearing 54 and its threaded connection to the mobile support 14.

In the normal position A, the compensation system 46 of FIG. 2 has an identical function to that of the sub-assembly consisting of the thrust ball bearing 36 of FIG. 1. Thus one has operation of the tool in normal production.

In the reinitialisating position B, the operation is as follows. During the displacement phase D1, in which the rollers 28 move in linear parts 34L of the slides, nothing happens in the compensation system, since the mobile support 14 does not rotate and the plate 16 is driven by the same translation movement as in the normal position A.

When each of the rollers 28 enters the helicoidal part 34H of the corresponding slide, the mobile support 14 starts to turn, whereas the hub 50, which is locked in rotation by the plate 16, will advance on the mobile support 14 in the direction of the arrow F. This advance, which is superimposed on that generated by the helicoidal parts 34H of the slides, will therefore compensate the increase in distance between the mobile elements 18 and 20, this increase being due to wear when the elements 18 and 20 form an electrode and counter-electrode respectively. The movement is stopped by the coming into contact of the elements 18 and 20 on a block gauge (not shown), or directly with one another.

This compensation system, whose actual advance depends on the relative value of the pitch of the thread 48 between the mobile support 14 and the hub 50 and of the pitch of the helicoidal parts 34H of the slides 34, provides for every case of use a thickness of block gauge to be defined and a periodicity of reinitialisation. The ideal is that this operation is carried out in one single closure of the clamping tool and in a time blocked out for the use thereof. It should be noted that the setting in rotation of the mobile support 14, only at the end of phase D1, avoids any risk of seeing clamping produced in this phase after reinitialisation.

Obviously, if reinitialisation could not be carried out in one operation (e.g. if the rollers 28 reach the bottom of the slides before the elements 18 and 20 touch one another or touch the block gauge), it is possible to repeat a second operation.

However, the following points should be noted.

The rollers 28 and the helicoidal parts 34H of the slides will generate rotation of the mobile support 14 in one direction upon closing, and in the other direction upon opening, such that in the position B, the hub 50 will move in the direction of the arrow F upon closure, and in the opposite direction upon opening.

This implies that any opening of the clamping tool which follows reinitialisation, whether it be in a single operation or in a multiple operation, must be effected in the position A, in order that the hub 50 does not carry out cycles which would cancel out upon closure and reopening.

It should be noted that the compensation system also makes it possible to effect re-calibration, e.g. after the change of electrodes, or test settings, in particular to carry out tests with strain gauges. These operations will be carried out advantageously by displacing manually the hub 50 into the position C before returning to the position A for the tests.

In the particular case where the elements are electrodes, the possibility of an automatic change of electrodes would involve in fact moving apart of their supports in order to compensate for the fact that the new electrodes are longer. This moving apart can be obtained by the use of the position B in a phase of opening of the clamping tool. Reinitialisation is then carried out by the cycle defined above. This process can obviously be applied to any change of electrode, manually or for any other operation.

Finally, in the case of small screw pitches between the mobile support 14 and the hub 50, it will be possible if necessary to allow that the irreversibility of the screw-nut system is sufficient to lock the two pieces in the position A.

We refer now to FIG. 3, in which the compensation system 46 is represented with positioning means which comprise a nut plate 66 rigid in rotation with the hub 50 due to axial spindles 68 coming from one end 70 of the hub and engaging in respective holes 72 in the nut plate. This nut plate is therefore freely displaceable in axial translation relative to the hub within the limits of the play between the different threads of the parts concerned. It is threaded inside in order to cooperate with the male thread 48 of the mobile support 14. A spring 74, helicoidal in the example, is engaged in a cavity of the hub 50 and is contrived to move the nut plate 66 away from the end 70 of the hub. Here, unlike the embodiment of FIG. 2, the respective positions of the collar 62 and of the nut 64 are reversed. In other words, the collar 62 is at the lower end of the hub 50 and the nut 64 at the upper end of the hub 50 (in the drawing). It is therefore the collar 62 which forms the end 70 of the hub.

The assembly formed by the nut plate 66 and the hub 50 operates as a nut and reverse counter-nut system, i.e. when the nut plate 66 is pressed against the hub 50, the assembly behaves like a single nut rotating without stress on the thread 48 of the mobile support 14. When the nut plate 66 moves apart from the hub 50 under the effect of the spring 74, the nut plate 66 and the hub 50 create a stress on the thread turns which makes them rigid with the mobile support 14. For good functioning of the system, the thread of the nut plate 66 is formed with a generous play.

The positioning means further comprise solenoid plungers 78 rigid with a mobile disc 76 and traversing the plate 16 forming part of the mobile element. This plate carries a winding 80 (composed of plural coils) contrived, when supplied with electricity, to displace the nut plate 66 towards the end 70 of the hub 50 (therefore towards the collar 62) and the mobile disc 76 rigid with the solenoid plungers 78 towards the nut plate 66, against a spring-back element 82 acting on the solenoid plungers. In the example, this spring-back element is formed by Belleville washers. A ring 84 pierced with suitable apertures is traversed by the solenoid plungers 78 and is held between the spring-back element 82 and nuts 86 screwed respectively on to the solenoid plungers 78.

In the normal position A, the winding 80 is not supplied with electricity, so that the nut plate 66 is moved away from the end 70 of the hub, thus effecting locking of the hub on the tubular support 14. There is therefore an interval or air gap $E_1$ between the nut plate 66 and the mobile disc 76 (FIG. 3).

In the reinitialising position B (FIG. 4), the winding 80 is supplied with electricity so that the nut plate 66 comes closer into contact with the end 70 of the hub 50 and that the mobile disc 76 comes closer into contact with the nut plate 66, thus effecting locking of the hub 50 on the plate 16 and, consequently, on the first element 18. The spring-back element 82 is then compressed under the effect of the traction force generated by the solenoid plungers 78. There is therefore an interval or air gap $E_2$ between the mobile disc 76 and the winding 80 (FIG. 4).

In the intermediate position C (FIG. 5), the winding 80 is supplied with electricity in such a manner that the nut plate 66 is brought closer into contact with the end 70 of the hub 50, whereas the mobile disc 76 is brought close to the nut plate 66 without coming into contact therewith due to the fact that the solenoid plungers 78 are held in an intermediate position, the hub being free except by its connection to the thrust ball bearing and its threaded connection to the mobile support 14. This holding in an intermediate position can be obtained by interposing a suitable wedge 88 between the plate 16 and the ring 84. The wedge 88 determines this intermediate position and prevents the mobile disc 76 and the nut plate 66 from coming into contact and consequently binding. There is therefore an interval or air gap $E_3$ between the nut plate 66 and the mobile disc 76 (FIG. 5), which is smaller than the interval or air gap $E_1$ (FIG. 3).

The invention is applied generally to clamping tools, in particular soldering pliers, but also to other types of tools, such as for example disc braking systems or injection moulding machines.

More generally, it can be applied whenever displacements along an axis require significant changes in mechanical features (stresses and speeds), either with or without specific wear of the parts in contact.

The realisation of the wear compensation system and of its three positions A, B and C can also be carried out with auxiliary motorisation or any other automatic or manual system.

The state of wear of the elements 18 and 20 can be measured permanently by monitoring the angle of rotation of the mobile support 14. This measurement, carried out in real time, can in most cases involve a correction in blocked out time.

The invention claimed is:

1. A clamping tool comprising a first element and a second element capable of relative displacement under the action of a drive mechanism, the clamping tool comprising a screw with a given pitch adapted to be driven in rotation about an axis in one direction or in the opposite direction under the action of a motor; a nut cooperating with the screw and adapted to be driven in translation in the direction of the axis of the screw, the nut being rigid in translation with the first element; a first guide section defining a linear guide parallel to the axis of the screw in order to lock the nut in rotation in a first phase of displacement of the nut; and a second guide section defining a helicoidal guide which extends along the axis of the screw and which second guide section has an inverted pitch relative to the pitch of the screw in order to allow rotation of the nut in the same direction of rotation as the screw in a second phase of displacement of the nut, the clamping tool further comprising a compensation system interposed between the first element and a mobile support rigid with the nut in order to reinitialize a position in which the nut leaves the first guide section to meet the second guide section, so that the first and second phases of displacement generated by the first and second guide sections remain synchronous.

2. The clamping tool according to claim 1, wherein the compensation system comprises the mobile support in the form of a tubular element rigid with the nut and equipped with a male thread, as well as a hub with a female thread and cooperating with the male thread of the mobile support, the hub supporting the first element via a thrust ball bearing.

3. The clamping tool according to claim 2, further comprising a positioning mechanism for selectively placing the hub in one of the three following positions;
   normal position ("position A") in which the hub is rigid in translation and in rotation with the mobile support;
   reinitialising position ("position B") in which the hub is rigid in translation and rotation with the first element; and
   intermediate position ("position C") in which the hub is free except for its connection to the thrust ball bearing and its threaded connection to the mobile support.

4. The clamping tool according to claim 3, wherein the positioning mechanism comprises a nut plate rigid in rotation with the hub, freely displaceable in axial translation relative to the hub and with the female thread to cooperate with the male thread of the mobile support; a spring contrived to move the nut plate away from one end of the hub; solenoid plungers rigid with a mobile disc and traversing a plate forming part of the first element; and a winding carried by the plate and contrived, when supplied with electricity, to displace the nut plate towards the one end of the hub and the mobile disc rigid with the solenoid plungers towards the nut plate, counter to a spring-back element acting on the solenoid plungers.

5. The clamping tool according to claim 3, taken in combination, wherein:
   in the normal position ("position A"), the winding is not supplied with electricity, so that the nut plate is apart from the one end of the hub, thus effecting locking of the hub on the mobile support;
   in the reinitialising position ("position B"), the winding is supplied with electricity, so that the nut plate comes closer into contact with the one end of the hub and the mobile disc comes closer into contact with the nut plate, thus effecting locking of the hub on the plate and, consequently, on the first element; and
   in the intermediate position ("position C"), the winding is supplied with electricity, so that the nut plate is brought closer into contact with the one end of the hub, whereas the mobile disc is brought closer to the nut plate without coming into contact therewith due to the fact that the solenoid plungers are held in the intermediate position, the hub being free except for its connection to the thrust ball bearing and its threaded connection to the mobile support.

6. The clamping tool according to claim 1, further comprising a fixed support which carries the motor and the second element.

7. The clamping tool according to claim 6, further comprising a column fixed to the fixed support and extending in a direction parallel to the axis of rotation of the screw in order to effect guiding in translation of the mobile support which carries the first element.

8. The clamping tool according to claim 1, further comprising a hollow cylindrical support which has a cylindrical wall centered on the axis of rotation of the screw, and in which are cut two opposite slides each defining the first and second guide sections, and in which respectively two tracking elements are displaced carried by the nut.

9. The clamping tool according to claim 1, wherein the clamping tool takes the form of soldering pliers, the first element and the second element forming an electrode and a counter-electrode, respectively.

* * * * *